United States Patent
Kim et al.

(10) Patent No.: US 8,457,047 B2
(45) Date of Patent: Jun. 4, 2013

(54) MULTIPLE PANS CONFLICT RESOLUTION METHOD IN ZIGBEE

(75) Inventors: Hyun-Hak Kim, Daejeon (KR);
No-Seong Park, Daejeon (KR);
Yoonmee Doh, Daejeon (KR);
Jong-Arm Jun, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 897 days.

(21) Appl. No.: 12/534,289

(22) Filed: Aug. 3, 2009

(65) Prior Publication Data

US 2010/0150065 A1    Jun. 17, 2010

(30) Foreign Application Priority Data

Dec. 15, 2008  (KR) .................. 10-2008-0126993

(51) Int. Cl.
*H04W 16/24* (2009.01)
(52) U.S. Cl.
USPC ........................................ 370/328
(58) Field of Classification Search
USPC ........................................ 370/328
See application file for complete search history.

(56) References Cited

U.S. PATENT DOCUMENTS

| 6,226,502 | B1 * | 5/2001 | Chung ..................... 455/118 |
| 7,391,815 | B2 | 6/2008 | Lakkis |
| 2002/0098878 | A1 * | 7/2002 | Mooney et al. ............... 455/569 |
| 2006/0121855 | A1 * | 6/2006 | Dillon ............................ 455/69 |
| 2006/0198337 | A1 | 9/2006 | Hoang et al. |
| 2006/0253570 | A1 | 11/2006 | Biswas et al. |
| 2009/0086683 | A1 * | 4/2009 | Pendergrass et al. ......... 370/335 |
| 2009/0096683 | A1 * | 4/2009 | Rosenblatt et al. ........... 343/702 |
| 2010/0061351 | A1 * | 3/2010 | Lee et al. ..................... 370/338 |

FOREIGN PATENT DOCUMENTS

| KR | 10-2006-0124498 | 12/2006 |
| KR | 10-2007-0051301 | 5/2007 |
| KR | 10-0728356 B1 | 6/2007 |
| KR | 10-2007-0072711 A | 7/2007 |
| KR | 10-2008-0069459 | 7/2008 |
| KR | 10-2008-0070960 | 8/2008 |
| KR | 10-2008-0090892 | 10/2008 |

\* cited by examiner

*Primary Examiner* — Sulaiman Nooristany
(74) *Attorney, Agent, or Firm* — Kile Park Reed & Houtteman PLLC

(57) ABSTRACT

Disclosed is a method of preventing overlap of multiple PANs in a ZigBee network. According to the method of preventing overlap of multiple personal area networks (PANs) in the ZigBee network, a first node included in a first PAN of the ZigBee network verifies whether overlap of the multiple PANs occurs by verifying packets received from neighbor nodes, identifies beacon information of a neighbor node that causes the overlap of the multiple PANs by gradually adjusting radio frequency (RF) transmission wave, and adjusts a communication range based on the beacon information.

4 Claims, 10 Drawing Sheets ically limited. As an example, when
MULTIPLE PANS CONFLICT RESOLUTION METHOD IN ZIGBEE

CROSS-REFERENCE TO RELATED APPLICATION

This application claims the benefit of Korean Patent Application No. 10-2008-0126993, filed on Dec. 15, 2008, in the Korean Intellectual Property Office, the disclosure of which is incorporated herein by reference.

BACKGROUND

1. Field of the Invention

The present invention relates to a method of preventing overlap of multiple personal area networks (PANs).

2. Description of the Related Art

ZigBee is a standard technology for a data network having a low speed transmission rate, low power communication, and high efficiency, and ZigBee is proposed to support convenient use of local communication.

A general ZigBee network generates a single personal area network (PAN) using a connection to a single PAN coordinator (PANC) through a multi-hop. Each PANC has a PAN identity (ID), as its own ID, to distinguish one PAN from another, and has an authority to select or change a radiochannel to be used by the PAN.

A number of radio frequency (RF) channels that the Zigbee network may use is physa band is 2.4 GHz, an available number of the RE channels may be sixteen. Also, an available number of PANs may equal $2^{16}$ (65536) which is also a maximum number of PAN IDs.

Generally, pluralities of PANs are located relatively far from each other in the ZigBee network, thereby having no difficulty in using a same RF channel. However, a situation where nodes which use the same RF channel are located close to each other may occur due to an expansion of a PAN, a change in the network, and the like.

As described above, a possibility that a node of a PAN does not perform appropriate communication with a neighbor node of the corresponding PAN increases due to RF interference, as a number of nodes of different PANs that use the same RF channel increases. Particularly, since the 2.4 GHz band shares a frequency with an Institute of Electrical and Electronics Engineers (IEEE) 802.15.4 WLAN, there is a possibility of causing interference, in actuality, only three or four channels may be used without interference. In connection with the above, a frequency agility is supported in the ZigBee standard.

However, as a number of nodes that join to the network increases, a coverage of the network is enlarged, and thus, a PAN overlap where multiple PANs overlap with each other occurs. Also, the PAN overlap is worsened due to nodes that are rejoined after disconnection of the network.

SUMMARY

An aspect of the present invention provides a method of preventing overlap of multiple PANs in a ZigBee network that eliminates interference and prevents an incapability of connecting to a network by reducing overlap of multiple PANs of the ZigBee, thereby providing a smooth operation of a PAN.

According to an aspect of the present invention, there may be provided method of preventing overlap of multiple personal area networks (PANS) in a ZigBee network, the method performed by a first node included in a first PAN of the ZigBee network including verifying whether overlap of the multiple PANs occurs by verifying packets received from neighbor nodes, identifying beacon information of a neighbor node that causes the overlap of the multiple PANs by gradually adjusting radio frequency (RF) transmission wave, and adjusting a communication range based on the beacon information.

In this instance, the verifying of the overlap of the multiple PANs may include verifying the packets received from the neighbor nodes, and identifying overlap of the multiple PANs where overlap in communication ranges with neighbor nodes included in different PANs occurs.

Also, the identifying of the beacon information may include transmitting a beacon request message by gradually changing a strength level of the RF transmission wave, receiving a beacon response message in response to the beacon request message, gradually adjusting the RF transmission wave, and identifying the beacon information of the neighbor node that causes the overlap of the multiple PANs, when the overlap of the multiple PANs is verified.

Also, the beacon information may be included in the beacon response message.

Also, the adjusting of the communication range may include determining a strength level of an RF transmission wave to be capable of preventing the overlap of the multiple PANs based on the beacon information.

Also, the method may her include connecting the first node to the second node, when a second node that is a node in the first PAN is a closest node to the first node among nodes in the communication range of the first node.

Also, the method may further include connecting the first node to the second node and joined to a second PAN, when a second node that is a node in the second PAN is a closest node to the first node among nodes in the communication range of the first node.

According to an aspect of the present invention, there may be provided a method of preventing overlap of multiple PANs in a ZigBee network, the method performed by a first node included in a first PAN of the ZigBee network including determining whether a communication status of communication performed over the first PAN satisfies a predetermined communication standard, identifying beacon information of a neighbor node included in a different PAN that causes overlap with the first PAN by gradually changing an RF transmission wave, when the communication status does not satisfy the communication standard, and adjusting a communication range based on the beacon information.

In this instance, the identifying of the beacon information of the neighbor node may include transmitting a beacon request message by gradually changing a strength level of the RF transmission wave, receiving a beacon response message in response to the beacon request message, gradually adjusting the RF transmission wave, and identifying the beacon information of the neighbor node included in the different PAN that causes the overlap with the first PAN, when the overlap with the first PAN is verified.

Also, the beacon information may be included in the beacon response message.

Also, the adjusting of the communication range may adjust the communication range by determining a strength level of an RE transmission wave to be capable of preventing overlap with the first PAN based on the beacon information.

Also, the method may further include connecting the first node to a second node, when the second node that is a node in the first PAN is a closest node among nodes in the communication range of the first node.

Also, the method may further include connecting the first node to a second node and included in the second PAN, when the second node that is a node in the second PAN is a closest node among nodes in the communication range of the first node.

Also, the predetermined communication standard may be a standard that is related to a transmission/reception rate and a transmission/reception error generation rate of each node over the PAN.

According to an aspect of the present invention, there may be provided a node capable of preventing overlap of multiple PANs in a ZigBee network including a communication unit to perform transmission and reception of packets with neighbor nodes, and a node controlling unit to verify overlap of the multiple PANs. Herein the node controlling unit may identify beacon information of a neighbor node that causes overlap of the multiple PANs by gradually adjusting an RF transmission wave transmitted via the communication unit, and may adjust a communication range based on the beacon information.

Also, the node controlling unit may verify overlap of the multiple PANs where overlap in communication ranges with neighbor nodes included in different PANs occurs by verifying the packets.

Also, the node controlling unit may include transmitting a beacon request message by gradually changing a strength level of the RF transmission wave through the communication unit, receiving a beacon response message in response to the beacon request message, gradually adjusting the RF transmission wave, and identifying the beacon information of the neighbor node that cause the overlap of the multiple PANs, when the overlap of the PAN is identified.

Also, the node controlling unit may adjust the communication range by determining the strength level of the RF transmission wave to be capable of preventing the overlap of the multiple PANs based on the beacon information.

According to an aspect of the present invention, there may be provided a node capable of preventing overlap of multiple PANs in a ZigBee network including a communication status determining unit to determine whether communication status of communication performed over a first PAN satisfies a predetermined standard, a beacon information verifying unit to identify beacon information of a neighbor node included in a different PAN that causes overlap with the first PAN by gradually adjusting an RF transmission wave, when the predetermined communication standard is not satisfied; and a communication controlling unit to adjust a communication range based on the beacon information.

In this instance, the predetermined communication standard is a standard related to a transmission/reception rate and a transmission/reception error generation rate of each node over the PAN.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
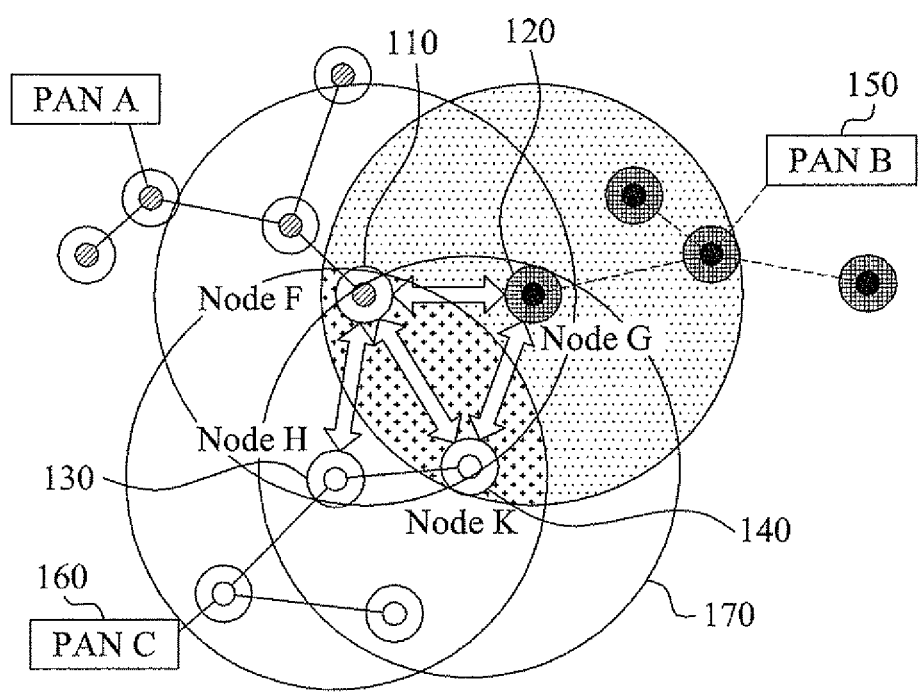
FIGS. 1 through 6 are configuration diagrams illustrating a ZigBee network to explain a method of preventing overlap of multiple personal area network (PAN) in the ZigBee network according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIGS. 1 through 6 are configuration diagrams illustrating a ZigBee network to explain a method of preventing overlap of multiple PANs in the ZigBee network according to an embodiment of the present invention.

As illustrated in FIG. 1, a node F 110, a node G 120, a node H 130, and a node K 140 sense overlapping multiple personal area networks (PANs).

Particularly, each of the nodes F, G, H, and K 110, 120, 130, and 140 verifies which PANs are overlapped with itself using a packet received from a neighbor node.

As an example, the node F 110 is affected by overlap interference since the node F 110 is included in an RF communication radius of the node H 130, the node K 140, and the node G 120, the node H and the node K 140 being included in a PAN C 160 and the node G 120 being included in a PAN B 150. The node F 110 performs a delay for a period of time to enable the neighbor nodes, that is, the node G 120, the node H 130, and node K 140, to sense the overlap.

Subsequently, each of the nodes transmits a beacon request message by changing a strength level of an RE transmission wave, and stores and analyzes beacon information in response to the beacon request message, to eliminate the overlap between the nodes. In this instance, the strength level of the RF transmission wave may be a strength level that is capable of communicating with a PAN being interfered with.

Figure 2:
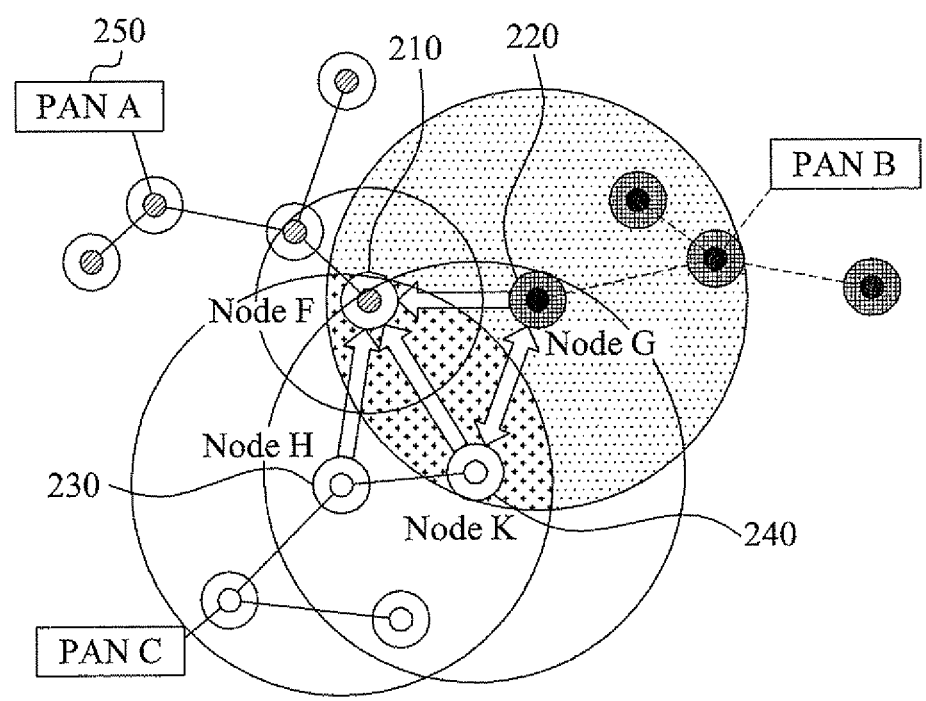

Subsequently, as illustrated in FIG. 2, a node F 210 sets a strength level of an RF transmission wave to be appropriate for maintaining a connection with existing nodes included in a PAN A 250.

Figure 3:
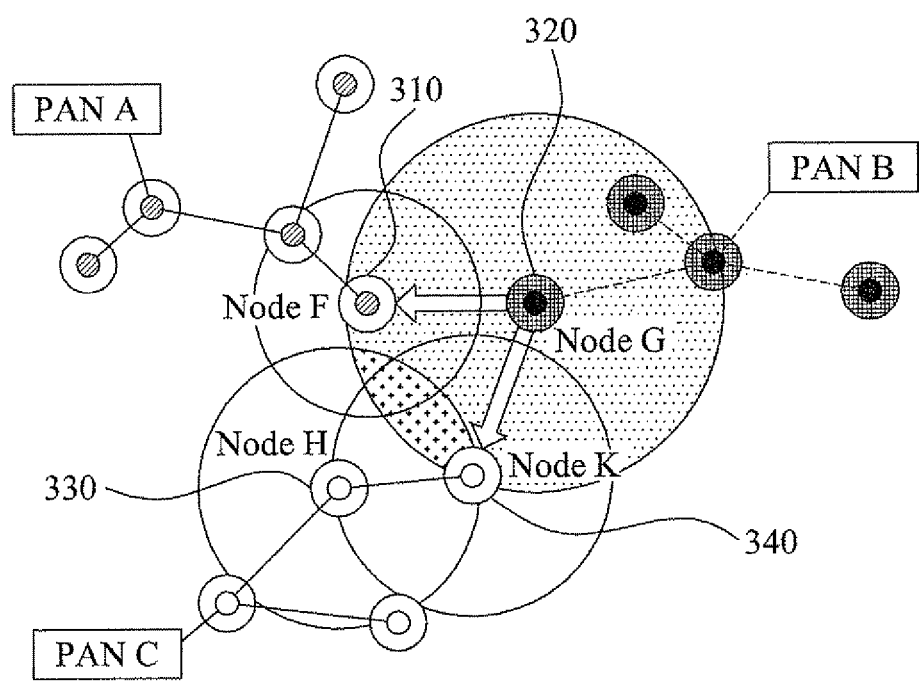

In the same manner, as illustrated in FIG. 3, a node G 320, a node H 330, and a node K 340 adjust a strength level of an RF transmission wave. As a result of the adjustment RF communication radius' of a node F 310, the node H 330, and the node K 340 may not overlap with the nodes included in different PANs.

However, even though the node G 320 adjusts the strength level of the RF transmission wave, an RF communication radius of the node G 320 still causes a PAN overlap of the node F 310 and the node K 340.

Figure 4:
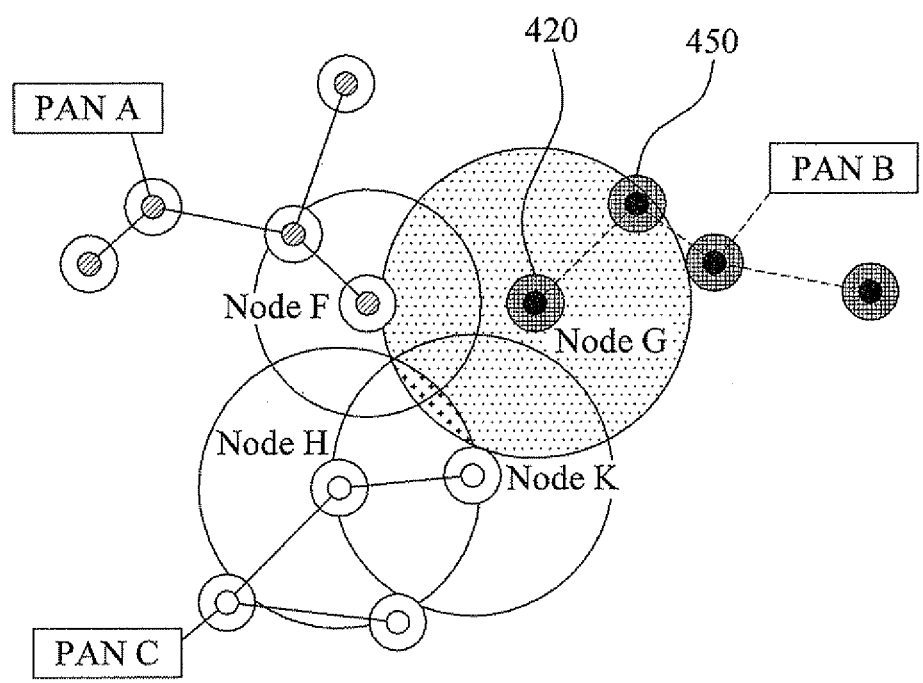

Accordingly, as illustrated in FIG. 4, a node G 420 sets a strength level of an RF transmission wave to be weaker and connects to a node M 450 based on stored beacon information. Therefore, the node G 420 may set the strength level of the RF transmission wave to be weaker to eliminate the PAN overlap.

Figure 5:
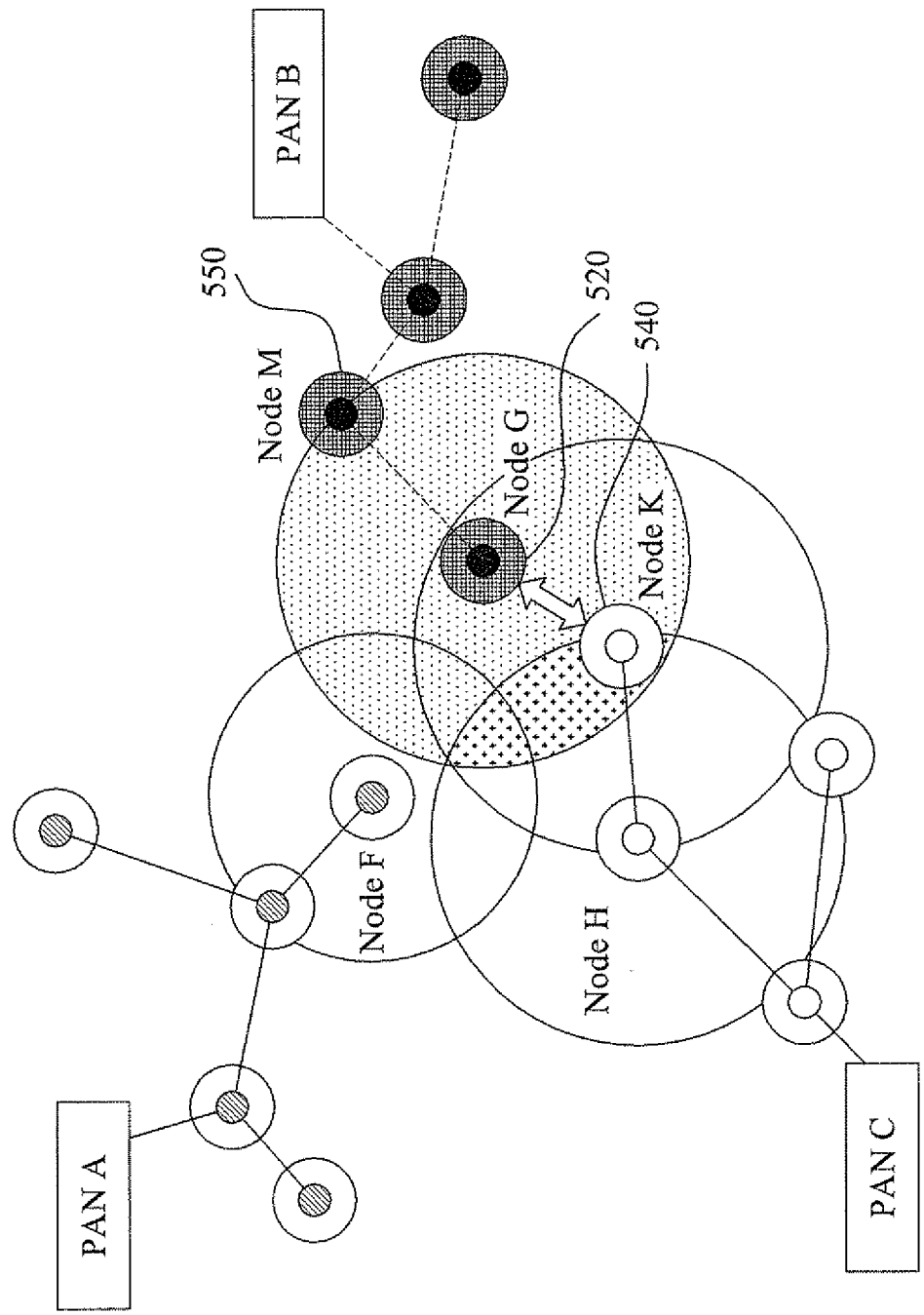

However, as illustrated in FIG. 5, a node K 540, interferes with communication between the node G 520 and the node M 550, and thus the node G 520 may not perform smooth communication.

Figure 6:
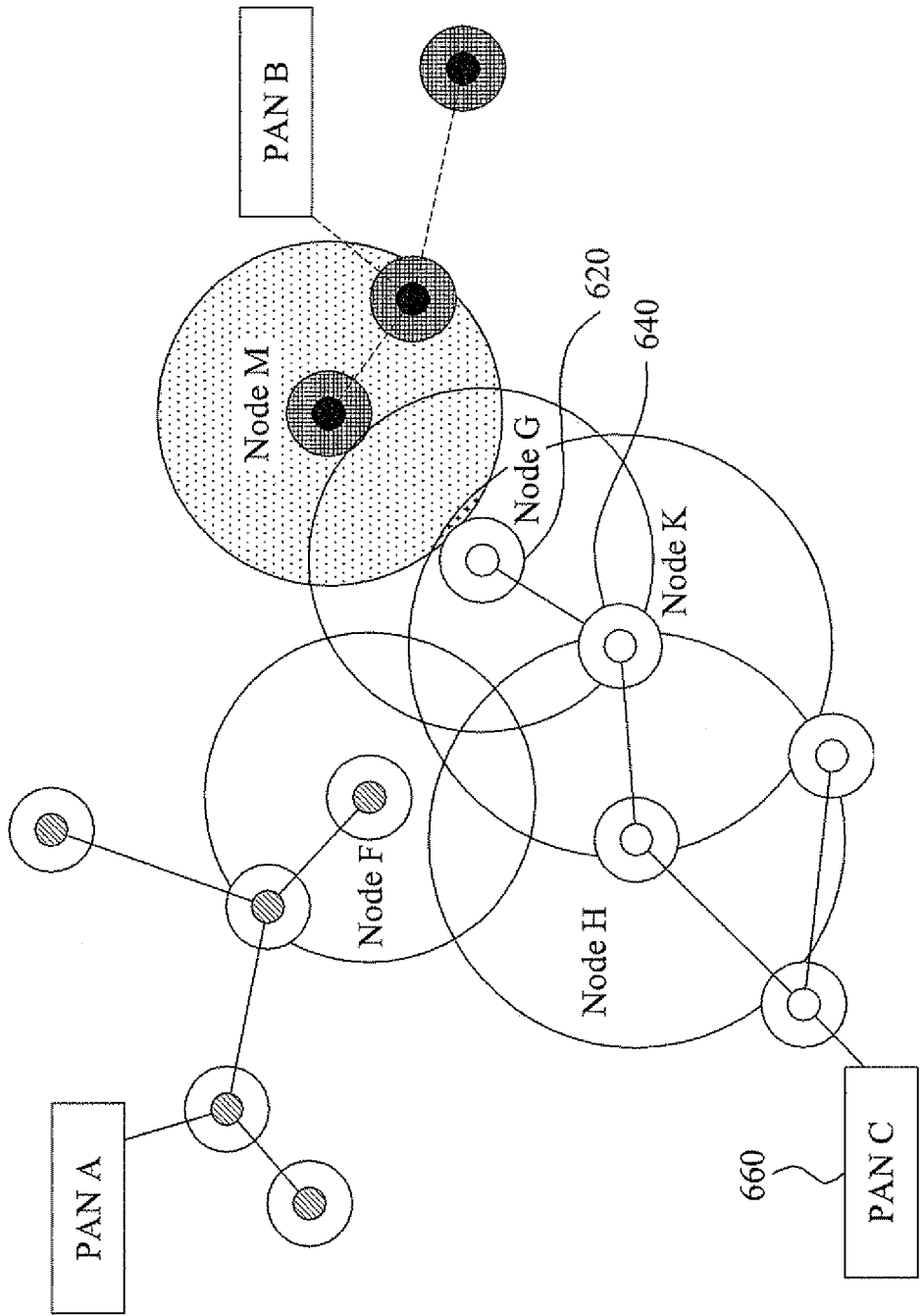

Accordingly, as illustrated in FIG. 6, a node G 620 appropriately adjusts a strength level of an RF transmission wave, transmits a join request packet to a node K 640, and connects to the node K 640 to join a PAN C 660.

Therefore, a method of preventing multiple PANs according to the present invention may eliminate interference and prevents an incapability of connecting to a network by reducing overlap of multiple PANs of the ZigBee network.

Figure 7:
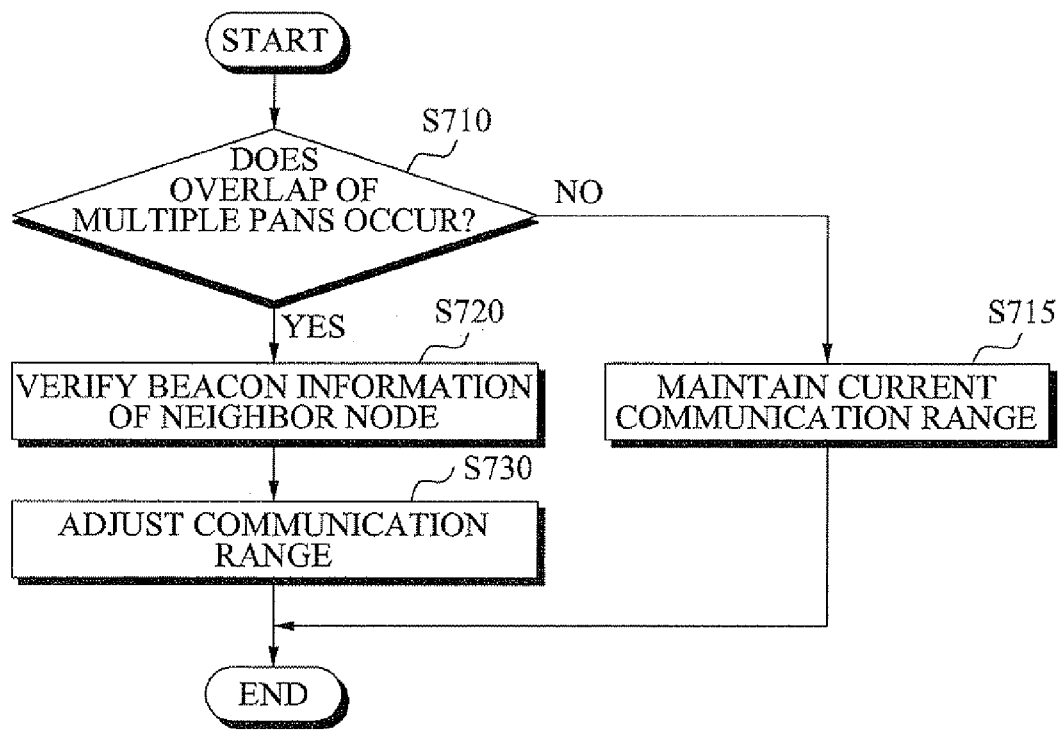
FIG. 7 is a flowchart illustrating a method of preventing overlap of multiple PANs in a ZigBee network according to an embodiment of the present invention.

FIG. 7 is a flowchart illustrating a method of preventing overlap of multiple PANs in a ZigBee network according to an embodiment of the present invention. The method of preventing the overlap of the multiple PANs in the ZigBee network will be described with reference to FIG. 7.

As described with reference to FIG. 7, a first node included in a first PAN of the ZigBee network verifies a packet received from neighbor nodes to verify overlap of multiple PANs in operation S710.

Subsequently, the first node gradually adjusts the RF transmission wave to verify beacon information of a neighbor node that causes the overlap of the multiple PANs in operation S720.

In this instance, when the overlap of the multiple PANs is verified, the first node transmits a beacon request message by gradually changing a strength level of an RF transmission wave, receives a beacon response message in response to the beacon request message, and gradually adjusts the RF transmission wave. In this instance, the beacon information may be included in the beacon response message.

Also, when overlap of a PAN(multiple PANs?) does not occur as a result of verifying the packet received from neighbor nodes, current communication range of the first node is maintained in operation S715.

Subsequently, the first node adjusts the communication range based on the beacon information in operation S730.

In this instance, the first node may determine a strength level of the RF transmission wave to be capable of preventing the overlap of multiple PANs based on the beacon information, thereby adjusting the communication range.

Subsequently, when a second node that is a node in a first PAN is a closest node to the first node among nodes existing in the communication range of the first node, the first node is connected to the second node.

Also, when another second node that is a node in a second PAN is a closest node to the first node among nodes existing in the communication range of the first node, the first node is connected to the second node and the first node joins the second PAN.

Figure 8:
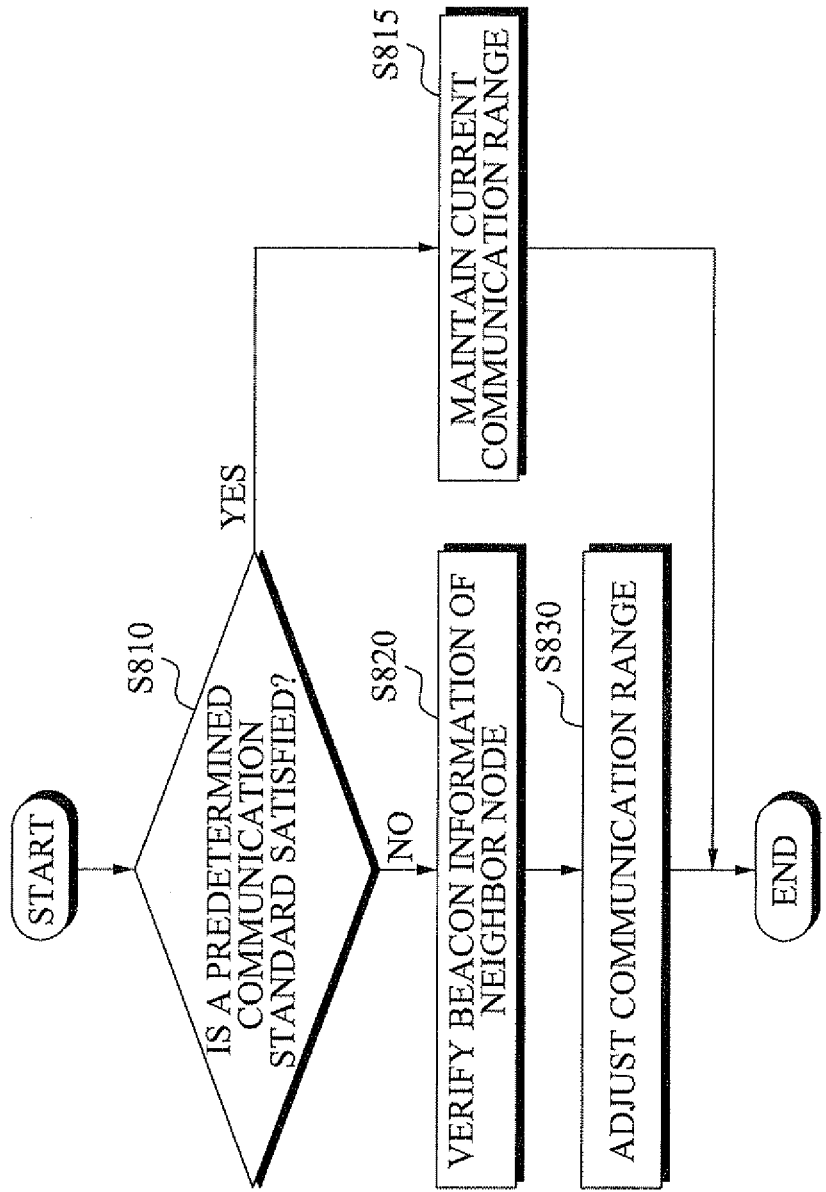
FIG. 8 is a flowchart illustrating a method of preventing overlap of multiple PANs in a ZigBee network according to another embodiment of the present invention.

FIG. 8 is a flowchart illustrating a method of preventing overlap of multiple PANs in a ZigBee network according to another embodiment of the present invention. Referring to FIG. 8, the method of preventing overlap of multiple PANs in the ZigBee network will be described with reference to FIG. 8.

As described with reference to FIG. 8, a first node included in a first PAN of the ZigBee network determines whether a communication status of communication performed over the first PAN satisfies a predetermined communication standard in operation S810.

In this instance, the predetermined communication standard may be a standard that is related to a transmission/reception rate and a transmission/reception error generation rate of each node over the PAN.

When the communication status does not satisfy the communication standard, the first node gradually adjusts the RF transmission wave to identify beacon information of a neighbor node included in a different PAN that causes overlap with the first PAN in operation S820.

In this instance, when the overlap of multiple PANs is verified, the first node transmits a beacon request message by gradually changing a strength level of the RF transmission wave, receives a beacon response message in response to the beacon request message, gradually adjusts the RF transmission wave, and thereby identifies the beacon information of the neighbor node included in the different PAN that causes the overlap with the first PAN. In this instance, the beacon information may be included in the beacon response message.

Also, when the communication status satisfies the predetermined communication standard, a communication range of the first node is maintained in operation S815.

Subsequently, the first node adjusts the communication range based on the beacon information in operation S830.

In this instance, the first node may determine a strength level of the RF transmission wave to be capable of preventing overlap of the multiple PANs based on the beacon information, thereby adjusting the communication range.

Subsequently, when a second node that is a node in the first PAN is a closest node to the first node among nodes existing in the communication range of the first node, the first node may be connected to the second node.

Also, when another second node that is a node in a second PAN is a closest node to the first node among nodes existing in the communication range of the first node, the first node may be connected to the second node, and the first node may be joined to the second PAN.

Therefore, the method of preventing multiple PANs according to an embodiment of the present invention may eliminate interference and prevents an incapability of connecting to a network by reducing overlap of multiple PANs of the ZigBee network.

Figure 9:
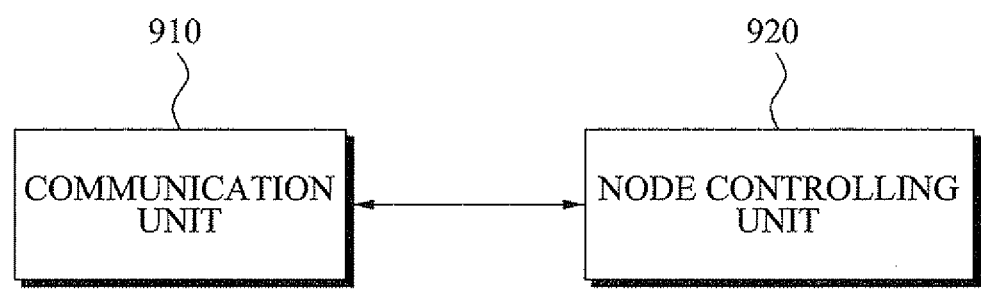
FIG. 9 is a configuration diagram illustrating contents of a node capable of preventing overlap of a multiple PANs in a ZigBee network according to an embodiment of the present invention.

FIG. 9 is a configuration diagram illustrating contents of a node capable of preventing overlap of a multiple PANs in a ZigBee network according to an embodiment of the present invention. The node capable of preventing overlap of the multiple PANs in the ZigBee network will be described with reference to FIG. 9.

As described with reference to FIG. 9, the node that is capable of preventing the overlap of the multiple PANs in the ZigBee network according to example embodiments includes a communication unit 910 and a node controlling unit 920.

The communication unit 910 performs transmission and reception of packets with neighbor nodes.

The node controlling unit 920 verifies whether the overlap of the multiple PANs occurs using the packet.

Also, the node controlling unit 920 verifies beacon information of a neighbor node that causes the overlap of the multiple PANs by gradually adjusting an RF transmission wave transmitted through the communication unit, thereby adjusting a communication range based on the beacon information.

The node controlling unit 920 may verify the overlap of the multiple PANs where overlap in a communication range with neighbor nodes included in different PANs occurs, by verifying the packets.

Also, when the overlap of the multiple PANs is verified, the node controlling unit 920 transmits a beacon request message through the communication unit 910 by gradually changing a strength level of the RF transmission wave, and receives a beacon response message via the communication unit 910 in response to the beacon request message.

Also, the node controlling unit 920 determines a strength level of the RF transmission wave to be capable of preventing overlap of the multiple PANs based on the beacon information.

Figure 10:
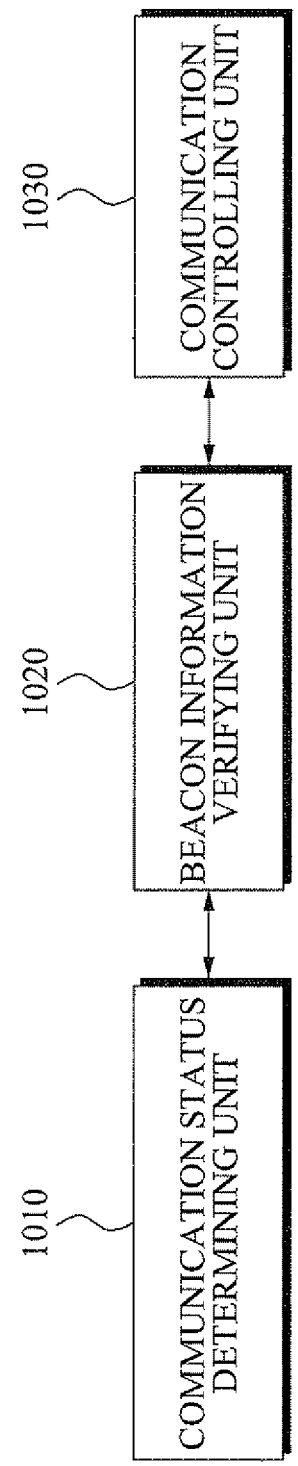
FIG. 10 is a configuration diagram illustrating contents of a node capable of preventing overlap of a multiple PANs in a ZigBee network according to another embodiment of the present invention

FIG. 10 is a configuration diagram illustrating a node capable of preventing overlap of a multiple PANs in a ZigBee network according to another embodiment of the present invention. The node that is capable of preventing overlap of the multiple PANs in the ZigBee network will be described with reference to FIG. 10.

As described with reference to FIG. 10, the node that is capable of preventing overlap of the multiple PANs in the ZigBee network includes a communication status determining unit 1010, a beacon information verifying unit 1020, and a communication controlling unit 1030.

The communication status determining unit 1010 determines whether communication status of a communication performed over the first PAN satisfies a predetermined communication standard.

In this instance, the predetermined communication standard may be a standard that is related to a transmission/reception rate and a transmission/reception error generation rate of each node over the PAN.

When the communication status does not satisfy the communication standard, the beacon information verifying unit 1020 gradually adjusts the RF transmission wave to identify beacon information of a neighbor node included in a different PAN that causes overlap with the first PAN.

The communication controlling unit 1030 adjusts the communication range based on the beacon information.

According to the present invention, the node that is capable of preventing the overlap of multiple PANs in the ZigBee may eliminate interference and prevent an incapability of connecting to a network by reducing overlap of multiple PANs of the ZigBee, thereby enabling a smooth operation of a PAN.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of preventing overlap of multiple personal area networks (PANs) in a ZigBee network, the method performed by a first node included in a first PAN of the ZigBee network, the method comprising:
   verifying whether overlap of the multiple PANs occurs by determining whether a communication status of communication performed over the first PAN satisfies a predetermined communication standard;
   when the overlap of the multiple PANs is verified, identifying beacon information of a neighbor node that causes the overlap of the multiple PANs by:
   transmitting a beacon request message to the neighbor node by gradually changing a strength level of the RF transmission wave, and
   receiving a beacon response message from the neighbor node in response to the transmitting the beacon request message, wherein the beacon response message comprises the beacon information of the neighbor node;
   adjusting a communication radius of the first node based on the beacon information of the neighbor node received in the beacon response message; and
   connecting the first node to a second node, when the second node that is a node in the first PAN is a closest node to the first node among nodes in the communication radius of the first node,
   wherein the adjusting of the communication radius comprises determining a strength level of an RF transmission wave to be capable of preventing the overlap of the multiple PANs based on the beacon information, and
   wherein the predetermined communication standard is a standard related to a transmission/reception rate or a transmission/reception error generation rate of each node over the first PAN.

2. A method of preventing overlap of multiple personal area networks (PANs) in a ZigBee network, the method performed by a first node included in a first PAN of the ZigBee network, the method comprising:
   verifying whether overlap of the multiple PANs occurs by determining whether a communication status of communication performed over the first PAN satisfies a predetermined communication standard;
   when the overlap of the multiple PANs is verified, identifying beacon information of a neighbor node that causes the overlap of the multiple PANs by:
   transmitting a beacon request message to the neighbor node by gradually changing a strength level of the RF transmission wave, and
   receiving a beacon response message from the neighbor node in response to the transmitting the beacon request message, wherein the beacon response message comprises the beacon information of the neighbor node;
   adjusting a communication radius of the first node based on the beacon information of the neighbor node received in the beacon response message; and
   connecting the first node to a second node and joined to a second PAN, when the second node that is a node in the second PAN is a closest node to the first node among nodes in the communication radius of the first node,
   wherein the adjusting of the communication radius comprises determining a strength level of an RF transmission wave to be capable of preventing the overlap of the multiple PANs based on the beacon information, and
   wherein the predetermined communication standard is a standard related to a transmission/reception rate or a transmission/reception error generation rate of each node over the first PAN.

3. A first node configured to prevent overlap of multiple PANs in a ZigBee network, wherein the first node is included in a first PAN of the ZigBee network and comprises:
   a communication unit configured to perform transmission and reception of packets with neighbor nodes; and
   a node controlling unit configured to:
   verify whether overlap of the multiple PANs occurs by determining whether a communication status of communication performed over the first PAN satisfies a predetermined communication standard;
   when the overlap of the multiple PANs is verified, identify beacon information of a neighbor node that causes the overlap of the multiple PANs by:
   transmitting a beacon request message to the neighbor node via the communication unit by gradually changing a strength level of the RF transmission wave, and
   receiving a beacon response message from the neighbor node via the communication unit in response to the transmitting the beacon request message, wherein the beacon response message comprises the beacon information of the neighbor node;

adjust a communication radius of the first node based on the beacon information of the neighbor node received in the beacon response message; and connect the first node to a second node, when the second node that is a node in the first PAN is a closest node to the first node among nodes in the communication radius of the first node, wherein the node controlling unit adjusts the communication radius by determining the strength level of the RF transmission wave to be capable of preventing the overlap of the multiple PANs based on the beacon information, and wherein the predetermined communication standard is a standard related to a transmission/reception rate or a transmission/reception error generation rate of each node over the first PAN.

4. A first node configured to prevent overlap of multiple PANs in a ZigBee network, the first node comprising:

a communication status determining unit configured to determine whether a communication status of communication performed over a first PAN satisfies a predetermined communication standard;

a beacon information verifying unit configured to, when the communication status does not satisfy the predetermined communication standard, identify beacon information of a neighbor node included in a different PAN that causes overlap with the first PAN by:

transmitting a beacon request message to the neighbor node by gradually changing a strength level of the RF transmission wave; and receiving a beacon response message from the neighbor node in response to the transmitting the beacon request message, wherein the beacon response message comprises the beacon information of the neighbor node; and a communication controlling unit configured to adjust a communication radius of the first node based on the beacon information of the neighbor node received in the beacon response message, wherein the communication controlling unit is configured to connect the first node to a second node and joined to a second PAN, when the second node that is a node in the second PAN is a closest node to the first node among nodes in the communication radius of the first node, and wherein the predetermined communication standard is a standard related to a transmission/reception rate or a transmission/reception error generation rate of each node over the first PAN.

* * * * *